United States Patent [19]

McGregor

[11] Patent Number: 4,741,562
[45] Date of Patent: May 3, 1988

[54] MULTI-CELL CONDUIT CONNECTION JOINT

[75] Inventor: Jimmie R. McGregor, Mineral Wells, Tex.

[73] Assignee: Harsco Corporation, Wormleysburg, Pa.

[21] Appl. No.: 948,080

[22] Filed: Dec. 31, 1986

[51] Int. Cl.$^4$ .................................................. F16L 39/00
[52] U.S. Cl. ..................................... 285/137.1; 285/93; 285/370; 285/423; 285/915
[58] Field of Search ..................... 285/137.1, 370, 423, 285/397, 915, 91, 93

[56] References Cited

U.S. PATENT DOCUMENTS

| | | | |
|---|---|---|---|
| 139,932 | 6/1873 | Sweetlonz | 285/397 X |
| 722,249 | 3/1903 | Pixley | 285/137.1 X |
| 767,463 | 8/1904 | Wilson . | |
| 1,810,142 | 6/1931 | Makowski . | |
| 2,340,926 | 2/1944 | Bradley | 285/137.1 |
| 3,133,753 | 5/1964 | Goodman et al. | 285/91 |
| 3,163,448 | 12/1964 | Franklin | 285/137.1 |
| 3,458,219 | 7/1969 | Wesch | 285/370 X |
| 3,535,741 | 10/1970 | Guerrero . | |
| 3,570,065 | 3/1971 | Guerrero . | |
| 3,606,395 | 9/1971 | Salerno et al. | 285/137.1 |
| 3,693,664 | 9/1972 | Schmunk . | |
| 3,753,575 | 8/1973 | Tracy | 285/137.1 |
| 3,941,157 | 3/1976 | Barnett . | |

*Primary Examiner*—Dave W. Arola
*Attorney, Agent, or Firm*—Kerkam, Stowell, Kondracki & Clarke

[57] ABSTRACT

A joint, and method for constructing the joint, are provided for connecting sections of multi-cell conduit in an end-to-end manner to produce long runs of conduit for carrying fiber-optic cables or the like, wherein the joints produced will isolate, in a substantially airtight manner, each of the individual cells from the adjoining cells.

17 Claims, 1 Drawing Sheet

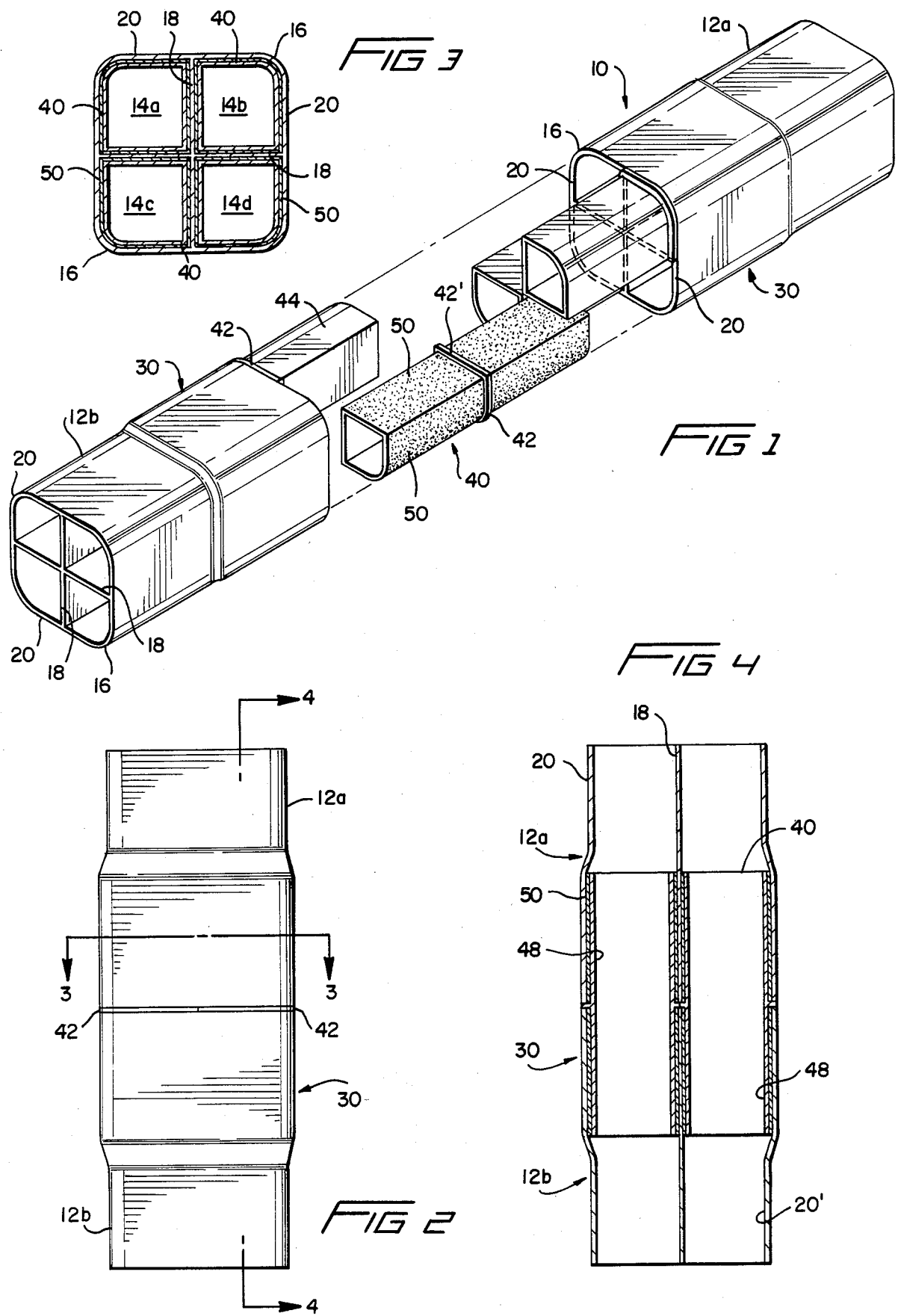

MULTI-CELL CONDUIT CONNECTION JOINT

BACKGROUND OF THE INVENTION

1. Field of the Invention

The present invention relates to devices and methods for joining abutting sections of multi-cell conduit.

2. Description of Related Art

Multi-cell conduit, and in particular quadri-cell conduit having four interior cells, has been used in various applications in the prior art. Because of this, there are also at least several known methods and devices for joining abutting sections of this conduit to hold the internal cells of one conduit section in alignment with the associated cells of the adjoining section.

The configuration of a typical quadri-cell conduit section has a single external wall having a generally square cross-sectional shape. Within this external wall is a web, or cross-shaped piece, usually made of the same material, each of the ends of the cross being attached to a different side of the external wall.

When the conduit is structurally fairly rigid, one of the more common ways to join and hold sections together is to use a sleeve which will fit snugly around the exterior perimeter of the ends of the two adjoining conduit sections. The adjoining ends of the sections are inserted into opposite ends of a sleeve, and the sections may be permanently secured to the sleeve by cementing the interior of the sleeve to the exterior of the conduit. A sleeve of this type may also be a two piece device held in place tightly by clamps cr similar fastening means.

Another known approach, shown in U.S. Pat. No. 722,249, for example, is to provide external notches or grooves into which alignment pins may be placed which will cause two sections to become aligned. This method, as described in the patent, is to be followed by the application of cement to the entire exterior of the joint to seal it from water.

U.S. Pat. No. 3,133,753 issued to Goodman, et al discloses a further approach. In one of the embodiments disclosed in this patent, each conduit section has a male and female end section. These specially configured end portions allow one end of a section to be inserted into an appropriately configured end of a second section of conduit. This joint takes on the appearance of interlocking fingers, which are subsequently pinned together with a special anchor pin.

In multi-cell conduit systems it is often desirable to isolate individual cells, and make them air tight. The aforenoted joining methods effectively join the exterior walls to one another, and will generally protect, or isolate, the joint from the external environment, but the individual internal cells are only isolated to the extent that the edges of the webs of the sections abut each other or come close to abutting each other. This is generally inadequate if it is desired to isolate individual cells from each other.

A primary modern use of quadri-cell conduit is for the underground carrying of fiber-optic, electrical, and/or telephone cables. Systems using multi-cell conduit can be designed to facilitate the addition of more cables for increased transmission capacity, either planned or unexpected. When the initial installation is made, generally only one or two of the four cells of a quadri-cell conduit string will be used to carry cable immediately and a sufficient number of conduit runs are laid so that there will be a sufficient number of spare or unutilized cells. Thus, when expansion is desired, roadways, sidewalks and land will not have to be torn up because the additional cables may be run through in the unutilized cells of the conduit previously installed.

It can be imagined that during initial installation, a cable may be fed incrementally through short runs of conduit. However, once the entire length of a conduit run has been laid and buried underground, any new installation would required the cable to be fed through the entire length all at once. One way in which this is accomplished in the industry is by propelling a line from one end of the run through to the opposite end of the run. The line is provided with a leader which covers all or substantial portion of the cross-section of a cell. The propulsion, provided by either a compressed air source or by controlled explosion, must push the line leader through the length of the cell, carrying the line with it. The cable to be installed is then attached and pulled through by the line. This is a preferred method even for initial installations of conduit and cable.

Because these conduit runs span great lengths, maintaining the pressure in the cell to drive the line through is critical to the success of the installation. The previously mentioned methods and devices for joining sections of conduit together do not generally provide a substantially airtight isolation of the individual cells from each other, and therefore a loss of pressure is likely to be experienced in a particular cell at each joint between sections of conduit. The presssure losses in long runs having many joints may be substantial enough that the line leader will not be propelled through the entire length, but will stop short of the opposite end of the run instead. This will tend to limit the maximum length over which a successful installation can be made.

It is therefore a principal object of the present invention to provide a multi-cell conduit system wherein a plurality of conduit sections are joined to each other in an end to end configuration, the system and joint design providing improved isolation of the individual cells from one another, as well as from the external environment, by use of cell inserts.

It is a further important object of the present invention to provide a method for making a joint and joining abutting sections of multi-cell conduit using cell inserts, which will facilitate installation of long runs of conduit containing many sections.

It is a further important object of the present invention to provide a system for joining, in an end-to-end manner, sections of substantially square cross-sectioned conduit containing four individual cells, wherein the four cells of each conduit section are symmetrical with respect to a 90° rotation about the longitudinal axis of the section, and the cell inserts are all identical and interchangeable.

It is a further important object of the present invention to provide a system for joining sections of multi-cell conduit which allows increased flexibility and ease of field installation operations.

It is another important object of the present invention to provide a simple and inexpensive way of making a joint which does not require an unduly burdensome inventory control to ensure all piece parts for making a joint are available in the field.

SUMMARY OF THE INVENTION

The above and other objects of the present invention are accomplished by providing sections of multi-cell conduit having a connector portion at one or both ends for receiving associated cell inserts. The cell inserts, either with or without adhesive being used, are positioned to engage the inside walls of associated cells of two sections facing each other and hold the sections in an end-to-end relationship.

The joining of conduit sections of this type is nearly always a field operation, because continuous runs of conduit may be desired in lengths measured in miles, and there is no practical way to achieve these lengths without field joining and installation. Always a key factor in assessing designs for connectors and joints is the ease of constructing the joint. Also, the logistical factor regarding how many different types of piece parts will be required to construct these joints is important.

In the present invention, one cell insert is provided for each pair of associated cells at each joint being made. The external cross-sectional configuration of each cell insert will correspond substantially in geometry to the internal cross section of the pair of cells which it will join together, such that an interference fit can be accomplished by insertion into the connector portions of these cells. In a quadri-cell conduit, two cell inserts are inserted part way into two cells of one of the two sections to be joined, and two additional cell inserts are inserted in a like manner into two cells of the other conduit section. Assuming each conduit contains four cells identified as a, b, c and d with cell a of one conduit to be joined to cell a of the other conduit and b to b, c to c and d to d, it will be apparent that two inserts are placed in any two cells of one conduit, cells a and b for example and the other two inserts are placed in the other two cells of the other conduit to be joined, i.e., cells c and d. Of course, other combinations may be used and conduits may include more or fewer than four cells.

The two conduit sections are then aligned along a common longitudinal axis and pushed together. When this is done, the cell inserts which are protruding from either end of the conduit will match up with and be inserted into the associated cell of the other section. When the conduit sections are pushed completely together, the cell inserts will act as internal sleeve-like members for each individual cell, sealing off the outside environment as well as sealing the "seams" between adjoining cells which otherwise would be sealed only to the extent that the end edges of the cell walls would substantially abut one another. This abutting type of joint, as described previously, is generally inadequate for putting together long runs of conduit and subsequently feeding a line through one or more cells using pressurized air.

An important feature of the present invention is that a relatively inexpensive, uncomplicated, easy to assemble system is provided for joining sections of conduit together.

An additional important feature is that the joint design of the present invention yields joints which are sealed around all cell walls, isolating the cells from one another, at each joint in the system.

BRIEF DESCRIPTION OF THE DRAWINGS

These and other features of the present and the attendant advantages will be readily apparent to those having ordinary skill in the art and the invention will be more easily understood from the following detailed description of the preferred embodiments of the present invention taken in conjunction with the accompanying drawings wherein like reference characters represent like parts throughout the several views, wherein:

FIG. 1 is a perspective and partially exploded view of a joint betwen two sections of conduit in the system of the present invention.

FIG. 2 is a side view of the external configuration of the joint of the present invention.

FIG. 3 is a sectional view taken along section line 3—3 of FIG. 2.

FIG. 4 is a sectional view taken along section line 4—4 of FIG. 2.

DESCRIPTION OF THE PREFERRED EMBODIMENT

Referring initially to FIG. 1, the joint making up a part of the system in a preferred embodiment of the invention is designated generally as numeral 10. The conduit sections 12a, 12b in the preferred embodiment have four internal cells 14 a–d (FIG. 3). The exterior cross-sectional configuration of the conduit sections is substantially square, and in the preferred embodiment the sections have rounded corners 16.

The conduit in the preferred embodiment is made of a polymeric material such as unplasticized polyvinyl chloride in a continuous extrusion process. Other materials may be used as well, provided that they can withstand the underground environment and also lend themselves to the joint design of the present invention. The die used to draw the material allows the cell divider walls 18 to be formed at the same time as the exterior wall 20. These cell divider walls 18 forming a cross-like pattern are sometimes referred to collectively as a web. It can be seen that conduit made by this process will be of a unibody construction.

This conduit must then be cut into sections that can be handled relatively easily, one standard length being 20 feet. These sections must eventually be taken into the field for on-site joining and installation into trenches or other subterranean tunnel. If these conduit sections were to be joined using some of the prior art connectors, like the ones using an external collar, they would be ready to be taken into the field once the sections had been cut.

In the system using the joint and joining method of the present invention, one further processing step is to be performed preferably before shipment to the field. The conduit sections 12a, 12b of the present invention are preferably sent to the field having pre-formed connector portions 30. Because each conduit section 12 will very likely be joined to conduit sections at both ends, the connector portions 30 are formed at both ends of each conduit section (not shown).

The connector portions 30 are formed in a separate process step after the cutting into sections has been performed. A process is used which is in some respects similar to pipe belling operations known in the art. A conduit section is placed on a machine having a heating element at both ends. The heating elements are used to heat a predetermined length of each end of the conduit section to a temperature where plastic deformation under applied force may be accomplished relatively easily. In no event would the process require a close approach to a melting or decomposing temperature of a polymer material. This may be controlled either by limiting the amount of heat generated or by controlling the length of time used to do the heating.

The heating elements are removed when an appropriate temperature is reached, and a means for expanding the conduit in these heated regions is then used. This can be a ram assembly having protruding elements which can be inserted into the open ends of the cells, for example. A ram assembly of this type could have four elements which, at their tips, are roughly the same cross-sectional shape as the cell openings, but having slightly smaller dimensions. The elements would be positioned to match up with the cells and would be fixed to a plate or other means maintaining their relative positions. The elements collectively thus would have a perimeter roughly approximating the original dimensions of the interior of walls 20. Each element would have an identical step-up taper, increasing this perimeter to something greater than the internal dimensions of walls 20. The elements reach a desired collective larger perimeter dimension and maintain this dimension constant over a predetermined length. The elements would be spaced from each other at a slightly greater distance than the thickness of the internal cell divider walls 18, to allow the ram assembly to be inserted without disturbing walls 18, and to ensure that the divider walls are not distorted excessively when outer wall 20 is expanded.

A ram assembly of this type would be inserted into both ends of the conduit section to produce an expanded connector section 30 along a predetermined length at each end of the conduit section. This length may be approximately four (4) inches for a 20-foot section of conduit, and it will preferably be the same four-inch length at both ends. The protruding elements will expand the entire exterior wall 20, and will slightly stretch the ends of divider walls 18 where they are joined to wall 20. This will produce connector portions 30 whose exterior walls will have a larger cross-sectional area than the cross-sectional area of the remainder of the conduit section.

Conduit sections of the preferred embodiment made in the above manner have symmetries making them very convenient to work with from an installer's standpoint. The ends of each section including connector portions 30 are formed to be substantially identical to each other, and therefore there is no problem in trying to make sure that male and female ends are matched up, for example. Additionally, the conduit 12 and the four cells 14a–d are symmetrical about the longitudinal axis of the section when moved through 90° rotations. Another term for this is four-fold symmetry about the longitudinal axis. Therefore, prior to insertion of any cell inserts 40, there would be no concern regarding a top, bottom, or sides of the conduit sections. The type of connector being used does not require any specific initial orientation, either.

The connector portions 30 at the ends of sections 12a and 12b are joined together using cell inserts 40. These cell inserts in the preferred embodiment have a ridge 42 protruding from at least part and preferably the entire perimeter of the exterior wall 44 of insert 40. The length of each part of the cell insert 40 extending axially from ridge 42 is preferably substantially equal to the length of connector portion 30 of the conduit section (see FIG. 4).

The exterior cross-sectional configuration and area of each cell insert 40 corresponds substantially in geometry to the internal cross sectional configuration and area of the cells in the expanded connector portions 30 of the conduit sections 12a, 12b. (see FIG. 3). In the preferred embodiment the cross-sectional area of the insert will be in proportion to, but slightly smaller than that of connector portion 30. This will allow clearance for a thin film of adhesive 50 to be applied to the exterior of the cell insert 40 prior to insertion. The adhesive would generally be either a solvent type, or any type which would provide a sufficient moisture barrier to the outside, as well as improve the airtightness of the joint.

A joint made with these components, i.e., the cell inserts and adhesive, is a relatively inexpensive one. In the quadri-cell system of the preferred embodiment, all cell inserts are identical. They can thus be mass produced by injection molding or any other economical process suitable for making shapes like this. There is no concern than certain quantities of several different parts or components would have to be manufactured or made into sets. The only requirement is that there be four inserts per joint. Several commercially available adhesive materials would be suitable for use with this system.

In a preferred method for preparing the joint of a quadri-cell system, the conduit sections 12 are worked with one at a time. Adhesive 50 is applied to the exterior of one half of a cell insert 40, and the insert is placed through the opening of one of the cells 14 of the connector portion 30 in a first conduit section until ridge 42 contacts and abuts against wall 20. Conduit section 12b in FIG. 1, shows how a section would appear at this stage. A second cell insert 40 is coated on half of its length (see numeral 50 for example) and is inserted into the same conduit section in the cell diagonally opposed to the cell already containing a cell insert. Conduit section 12a in FIG. 1 depicts the appearance of a conduit section after this step.

At this point, a visual and mental identification is made to determine which associated cells of the second conduit section will not be in a position to receive the cell inserts which have previously been inserted into the first section when the two sections are eventually aligned and pushed together. Once this identification has been made, cell inserts 40 are prepared with adhesive as before, and inserted into those cells identified above. It should be apparent at this point that the preferred diagonal placement of cell inserts 40 into a quadri-cell conduit section will leave exposed all sides of the protruding portion of all of the inserts 40. This will make the task of applying an even layer of adhesive to all exterior surfaces a relatively easy one.

To complete the joint, the adhesive 50 is applied to all exterior surfaces of the protruding portions of cell inserts 40. The conduit sections are then brought into alignment along a common longitudinal axis with connector portions 30 carrying the cell inserts facing each other. The sections are then moved toward each other, and the protruding portions of cell inserts 40 are received in the associated cells 14 of the other conduit section. The conduit sections 12a, 12b are moved together until ridges 42 on cell inserts 40 prevent further movement by both sections (see FIG. 2).

Ridges 42 will, in addition to providing a convenient way to determine how far to insert a cell insert 40 initially and a final stop for the two sections, provide a further important feature. In the field, it is not always easy to bring the two sections to be joined into exact axial alignment. Therefore, when the sections are pushed together, they may be at a slightly skewed angle to one another, causing some amount of binding between a protruding cell insert 40 and the connector portion 30 into which it is being urged. Normal variations due to manufacturing tolerances might also cause minor binding problems. The desire to finish jobs quickly may also cause sections to be joined before the initial applications of adhesive have set to hold the inserts in place in the first section. Depending upon the severity of the binding, for example, of a cell insert being urged into conduit section 12b of FIG. 4, there could be a tendency for the cell insert 40, which is generally made of a fairly pliable material, to be pushed instead back into the unenlarged portion of conduit section 12a, at which point the cell insert would buckle to fit into that unenlarged portion. This would ruin the smooth, tight seal intended for the interior of the joint of the cells. The ridges 42 provide a positive stop, so that even if binding occurs the cell insert will continue to be inserted in the proper direction.

The height of the portions of the ridges 42' provided in the spaces between cell divider walls 18 must be, at a maximum, half the thickness of a cell divider wall. While these portions 42' do not act primarily as a stop, they are desired to support the rigidity of the joint once the joint is effected.

The method described above may actually take on a slight variation in the field, but the same principle is involved, and the steps are equivalent to those described. It is envisioned that the conduit sections would be fitted with cell inserts prior to being aligned in a trench. The high degree of symmetry of both the ends of the conduit sections and the cell inserts allow this to be done. A method is envisioned wherein two cell inserts will be inserted, in the diagonal manner described above, into both ends of every conduit section. The sections would then be placed unconnected in or near the trench. The sections would then be joined sequentially starting at one end of the run and working toward the other. The first section referred to in the method above would thus be the starting section, and for the next and all succeeding joints, the "first" section will be the one previously joined to the run. The variation from that method previously described is that the connector portion 30 of the second conduit section will already have cell inserts placed in two of its cells. The identification step here is to determine whether the sections are aligned such that the protruding portions of the inserts will be received by empty cells of the opposing conduit section when pushed together. If they will, then the adhesive should be applied and the sections joined in the manner previously described. If, however, it is determined that the cell inserts would instead not be received by empty cells, the second section need only be rotated by 90° along its longitudinal axis. Because the weight of a 20-foot section made from a preferred material will be relatively light, this rotation may be accomplished easily by one person rolling or flipping it over. The 90° rotation will produce the necessary alignment of a protruding cell inserts for both sections. Working from one end to the other in creating a run of conduit, this can quickly be done as each successive joint is formed.

FIG. 2 shows the exterior of completed joint in the system according to the preferred embodiment. It can be seen in this view that it is preferred that the portion of ridges 42 exposed to the external environment have a height equal to the thickness of wall 20 (FIG. 4). In addition to fulfilling the need for a positive stop described previously this will maintain a smooth surface and present better sealing conditions against the outside environment.

FIG. 3 shows the joint of the preferred embodiment in cross-section. More specifically this cross-section is taken in the expanded connector portion 30 of one of the conduit sections. It can be seen best in this figure the relationship of the cross-sections of the cell inserts 40 and the cell walls made up of exterior wall 20 and cell divider walls 18. Also shown is the layer or coat of adhesive material 50, although because the drawing is not to scale, the relative thickness of the layer as shown may be slightly exaggerated. It is illustrated primarily to show that the joint will fully isolate each of cells 14a-d from the others. This Figure also illustrates best the symmetries and identicalities of the cells, cell inserts and the joint formed by this invention.

FIG. 4 shows the cell isolation in the joint taken in a longitudinal section. As can be seen here, the walls of cell insert 40 should be as thin as possible without sacrificing the structural integrity of the joint. The transition area between section 12a and section 12b should be as smooth as possible so that both the propelling of a line through the run and pulling the cable through can be accomplished without difficulty. Some amount of disruption will be inevitable along the cell divider walls using this joint design. This disadvantage is far outweighed by the isolation provided, and can be minimized by keeping the walls of the cell insert thin. At the exterior wall 20, no significant disruptions are evidenced. The expansion of connector portion 30 can be accomplished to a sufficient extent that the cell insert 40, having a wall thickness sufficient to provide the required joint integrity, will have an interior wall 48 that will have essentially the same dimensions as the interior unexpanded wall 20' of the conduit section.

Although the quadri-cell system is described as the preferred embodiment, the same or similar joints and methods for joining may be used in multi-cell conduit of other configurations as well.

The foregoing description includes various details and particular structures according to the preferred embodiment of the invention, however it is to be understood that these are for illustrative purposes only. Various modifications and adaptations will be apparent to those of ordinary skill in the art. Accordingly, the scope of the present invention should be determined by reference to the appended claims.

I claim:

1. A multi-cell conduit system having at least two sections of conduit to be joined end-to-end, said system comprising:

a first and a second section of multi-cell conduit, each section having an integral web forming a plurality of cells in an interior part of each section, each cell of said first section having an associated cell in said second section defining pairs of associated cells, each of said sections having a main portion and at least one integral connector portion, said connector portions having substantially identical cross-sectional configurations, said connector portions having expanded interior and exterior cross-sectional areas which are greater than interior and exterior cross-areas of said main portions, each of said connector portions extending axially inwardly for a predetermined distance from an end of said conduit section;

each of said pair of associated cells of said first and second conduit sections having an associated cell insert, each of said cells inserts having an external cross-sectional configuration conforming substantially in geometry to an internal cross-sectional configuration of the connector portions of its pair of associated cells; and a joint between said first and second sections said joint comprising a portion of each of said cell inserts extending into associated cells of the connector portion of the first and the second conduit section, the sections being aligned along their longitudinal axis with the ends holding the inserts facing each other such that a protruding portion of each of the cell inserts enters it associated cell in the opposing conduit section with said sections abutting each other.

2. A system as described in claim 1 wherein the conduit sections are substantially square in external cross-section and contain four cells.

3. A system as described in claim 2 wherein each conduit section has connector portion at both ends of the section.

4. A system as described in claim 2 wherein the conduit sections have rounded corners.

5. A system as described in claim 4 wherein each of the four cells of each conduit section is substantially square in cross-section, each cell having an associated rounded corner.

6. A system a described in claim 5 wherein the cells in said connector portions have identical cross-sectional configurations, and said cell inserts also have identical cross sectional configurations.

7. A system as described in claim 6 wherein each conduit section has a connector portion at both ends of the section.

8. A system as described in claim 6 wherein the connector portions of the conduit sections are equal in length.

9. A system as described in claim 8 wherein each conduit section has a connector portion at both ends of the section.

10. A system as described in claim 6 wherein the length of each cell insert is substantially equal to the combined length of the two connector portions to be joined.

11. A system as described in claim 8 wherein each cell insert has a ridge protruding from its exterior surface around at least a part of its perimeter at a midpoint along the axial direction, and the length of the portions of said cell inserts on either side of said ridge is substantially equal to or slightly less than the length of a connector portion.

12. A system as described in claim 1 wherein each conduit section has a connector portion at both ends of the section.

13. A joint for connecting abutting sections of multi-cell conduit, said cells having inner walls formed by an integral web, comprising:

a connector portion disposed at each end of each section of conduit to be joined, said connector portions having identical cross-sectional configurations, said connector portions having larger interior and exterior cross-sectional areas than corresponding interior and exterior cross-sectional areas of a main portion of said conduit, and wherein each cell of one section will have an associated cell in the other section defining pairs of associated cells;

a plurality of hollow cell inserts, the number of inserts for each joint corresponding to the number of cells in a section of conduit, said inserts having a length substantially equal to the combined length of the two connector portions to be joined, each of said pairs of associated cells having an associated cell insert having an exterior cross-sectional configuration corresponding substantially in geometry to an interior cross-sectional configuration of the connector portions of the pair of associated cells, wherein each of said cell inserts is inserted for substantially half of its length into one or the other of its associated cells leaving a protruding portion, and the joint is formed when the ends of the conduit sections are aligned and moved into abutment with each other, the protruding portion of each of said inserts being inserted into the associated cell of the other conduit section.

14. A joint as described in claim 13 wherein the multi-cell conduit comprises sections having four cells.

15. A joint as described in claim 14 wherein the exterior of the conduit is substantially square in cross-section.

16. A joint as described in claim 15, wherein the configuration of the cross-section of the connector portion contains four cells which are identical in cross-section, and the hollow cell inserts are identical and interchangeable.

17. A multi-cell conduit system having at least two sections of conduit to be joined end-to-end, said system comprising:

a first and a second section of multi-cell conduit made of a polymeric material, each having an integral web forming four cells in an interior part of each section, each cell of said first section having an associated cell in said second section defining pairs of associated cells, each of said sections having a main portion and at least one integral connector portion, said connector portions having substantially identical cross-sectional configurations, said cross-sectional configuration being in the shape of a square with four rounded corners, each of said connnector portions comprising an expanded end portion wherein an interior and an exterior cross-sectional area is greater than an interior and exterior cross-sectional area of said main portions, each of said connector portions extending axially inwardly for a predetermined distance from an end of said conduit section;

each of said pairs of associated cells of said first and second conduit sections having a substantially identical cross-sectional configurations, and each of said pairs of associated cells having an associated thin walled cell insert, said cell inserts being identical in configuration and further being interchangeable, each of said cell inserts having an external cross-sectional configuration conforming substantially in geometry to an internal cross-sectional configuration of the connector portions of its pair of associated cells, each of said cell inserts further having a ridge protruding from its exterior peripheral surface at an axial midpoint thereof, said ridge protruding from at least the portions of the peripheral surface of said cell inserts which will be disposed facing outwardingly; and wherein said cell inserts are adapted to extend into the connector portions of associated cells and are adapted to join each pair of associated cells of the first and the second conduit section when the sections are aligned along their longitudinal axis, and wherein the ridges of said cell inserts are adapted to form a substantially contiguous surface with the exterior walls of said connector portions when the conduit sections are joined.

* * * * *

UNITED STATES PATENT AND TRADEMARK OFFICE
CERTIFICATE OF CORRECTION

PATENT NO. : 4,741,562
DATED : May 3, 1988
INVENTOR(S) : McGregor et al

It is certified that error appears in the above-identified patent and that said Letters Patent is hereby corrected as shown below:

Column 8, line 67 "cells" should be --cell--
Column 9, line 11 "it" should be --its--
Column 9, line 25 second "a" should be --as--

Signed and Sealed this

Tenth Day of January, 1989

Attest:

DONALD J. QUIGG

Attesting Officer

Commissioner of Patents and Trademarks